United States Patent
Lysinger et al.

(10) Patent No.: US 10,520,748 B2
(45) Date of Patent: Dec. 31, 2019

(54) OPTICAL IMAGE STABILIZATION ACTUATOR DRIVER POWER DISTRIBUTION CONTROL

(71) Applicant: STMicroelectronics, Inc., Coppell, TX (US)

(72) Inventors: Mark A. Lysinger, Carrollton, TX (US); Chih-Hung Tai, Dallas, TX (US); James L. Worley, Flower Mound, TX (US); Pavan Nallamothu, Grand Prairie, TX (US)

(73) Assignee: STMicroelectronics, Inc., Coppell, TX (US)

( * ) Notice: Subject to any disclaimer, the term of this patent is extended or adjusted under 35 U.S.C. 154(b) by 0 days.

(21) Appl. No.: 15/944,421

(22) Filed: Apr. 3, 2018

(65) Prior Publication Data

US 2018/0224666 A1 Aug. 9, 2018

Related U.S. Application Data

(63) Continuation of application No. 14/976,937, filed on Dec. 21, 2015, now Pat. No. 9,964,777.

(51) Int. Cl.
*G02B 27/64* (2006.01)
*H02K 41/035* (2006.01)
*H02P 7/025* (2016.01)

(52) U.S. Cl.
CPC ....... *G02B 27/646* (2013.01); *H02K 41/0356* (2013.01); *H02P 7/025* (2016.02)

(58) Field of Classification Search
None
See application file for complete search history.

(56) References Cited

U.S. PATENT DOCUMENTS

| | | | |
|---|---|---|---|
| 9,167,161 B1 | 10/2015 | Tam | |
| 9,681,052 B1 | 6/2017 | Lewkow | |
| 9,952,445 B2 | 4/2018 | Tai et al. | |
| 10,025,276 B2* | 7/2018 | Lyden | G05B 5/01 |
| 2007/0031134 A1* | 2/2007 | Kuroda | G02B 13/0035 396/55 |

(Continued)

FOREIGN PATENT DOCUMENTS

| | | |
|---|---|---|
| CN | 1138268 A | 12/1996 |
| CN | 1815875 A | 8/2006 |

(Continued)

OTHER PUBLICATIONS

H. Sax "Stepper Motor Driving" Jun. 13, 2010 (Year: 2010).*
La Rosa et al., "Optical Image Stabilization (OIS)," published on ST.com, Dec. 2014, 26 pages.

*Primary Examiner* — Clayton E. LaBalle
*Assistant Examiner* — Dennis Hancock
(74) *Attorney, Agent, or Firm* — Seed IP Law Group LLP

(57) ABSTRACT

Various embodiments provide an optical image stabilization circuit including a drive circuit having a power waveform generator and a power waveform conversion circuit. The power waveform generator generates a power waveform. The power waveform conversion circuit converts the power waveform to a power drive signal. An actuator is then driven by the power drive signal to move a lens accordingly and compensate for any movements and vibrations of a housing of the lens.

20 Claims, 9 Drawing Sheets

(56) References Cited

U.S. PATENT DOCUMENTS

| | | | |
|---|---|---|---|
| 2007/0297779 A1* | 12/2007 | Fujisaki | G03B 5/00 |
| | | | 396/55 |
| 2009/0309521 A1 | 12/2009 | Yee et al. | |
| 2010/0009760 A1 | 1/2010 | Shimamura et al. | |
| 2010/0110203 A1 | 5/2010 | Noguchi | |
| 2010/0150537 A1* | 6/2010 | Tsuchihashi | G02B 27/646 |
| | | | 396/55 |
| 2010/0164650 A1* | 7/2010 | Abou-Alfotouh | |
| | | | H02M 3/1582 |
| | | | 333/181 |
| 2010/0290769 A1 | 11/2010 | Nasiri et al. | |
| 2011/0158620 A1* | 6/2011 | Kanayama | G03B 5/00 |
| | | | 396/55 |
| 2011/0317987 A1* | 12/2011 | Nakayama | G02B 27/646 |
| | | | 396/55 |
| 2015/0341531 A1 | 11/2015 | Senda | |
| 2016/0127646 A1 | 5/2016 | Osborne | |
| 2016/0341579 A1 | 11/2016 | Kimura et al. | |

FOREIGN PATENT DOCUMENTS

| | | |
|---|---|---|
| CN | 1890592 A | 1/2007 |
| CN | 101820239 A | 9/2010 |
| CN | 102890391 A | 1/2013 |
| CN | 103763468 A | 4/2014 |
| CN | 104281158 A | 1/2015 |
| CN | 104300847 A | 1/2015 |
| CN | 104982028 A | 10/2015 |

* cited by examiner

OPTICAL IMAGE STABILIZATION ACTUATOR DRIVER POWER DISTRIBUTION CONTROL

BACKGROUND

Technical Field

The present disclosure is directed to generating power drive signals for an actuator.

Description of the Related Art

Digital cameras have progressed to smaller sizes, lower weight, and higher resolutions. A drawback to this development, however, has been the impact of minor movements on image quality. Particularly, subtle movements or vibrations while capturing an image often causes image blurring. This is especially a problem for smartphones with built-in cameras, where users capture images with outstretched arms and have a greater chance of involuntary movements. Image stabilization is widely used to minimize image blurring. Current methods of image stabilization include digital image stabilization, electronics image stabilization, and optical image stabilization. Generally, digital image stabilization and electronics image stabilization require large amounts of memory and processor resources. Optical image stabilization, on the other hand, minimizes memory and processor demands by adjusting the lens position itself. As such, optical image stabilization is ideal for portable devices, such as smartphones and tablets with built-in cameras.

In general, optical image stabilization minimizes image blurring by sensing movements of a housing and compensating for the movements by adjusting the position of the camera lens. For example, see "Optical Image Stabilization (OIS)," Rosa et al, STMicroelectronics. Optical image stabilization circuits typically include a gyroscope, a controller, and a drive circuit that includes a large current source to drive an actuator to move the camera lens.

Most drive circuits output either a linear power drive signal having a constant voltage level or a standard pulse-width modulation power drive signal having high (i.e., 1) and low (i.e., 0) voltage levels with a certain duty cycle or frequency. For example, see "Optical Image Stabilization (OIS)," Rosa et al, STMicroelectronics. Linear power drive signals and pulse-width modulation power drive signals each having their own advantages. Namely, linear power drive signals are used to reduce noise, and standard pulse-width modulation power drive signals are used for power efficiency. Drive circuits, however, generally do not generate both linear and standard pulse-width modulation power drive signals.

BRIEF SUMMARY

The present disclosure provides an optical image stabilization circuit that generates power drive signals to drive an actuator.

According to one embodiment, a housing includes a camera lens; an actuator to move the lens; a position sensor; and an optical image stabilization circuit having a gyroscope, a controller, and a drive circuit. A power waveform generator of the drive circuit generates a power waveform based on power drive signal data received from the microcontroller. Subsequently, a power waveform conversion circuit of the drive circuit converts the power waveform to a corresponding power drive signal. The actuator is then driven with the power driven signal to move the lens accordingly and compensate for any movements and vibrations of the housing.

The optical image stabilization circuit disclosed herein is capable of generating linear power drive signals, standard pulse-width modulation power drive signals, and multi-state pulse-width modulation power drive signals to drive the actuator. The frequency of the power drive signals are limited only by the speed of the power waveform generator and the power waveform conversion circuit of the drive circuit.

BRIEF DESCRIPTION OF THE SEVERAL VIEWS OF THE DRAWINGS

The foregoing and other features and advantages of the present disclosure will be more readily appreciated as the same become better understood from the following detailed description when taken in conjunction with the accompanying drawings.

DETAILED DESCRIPTION

Figure 1A:
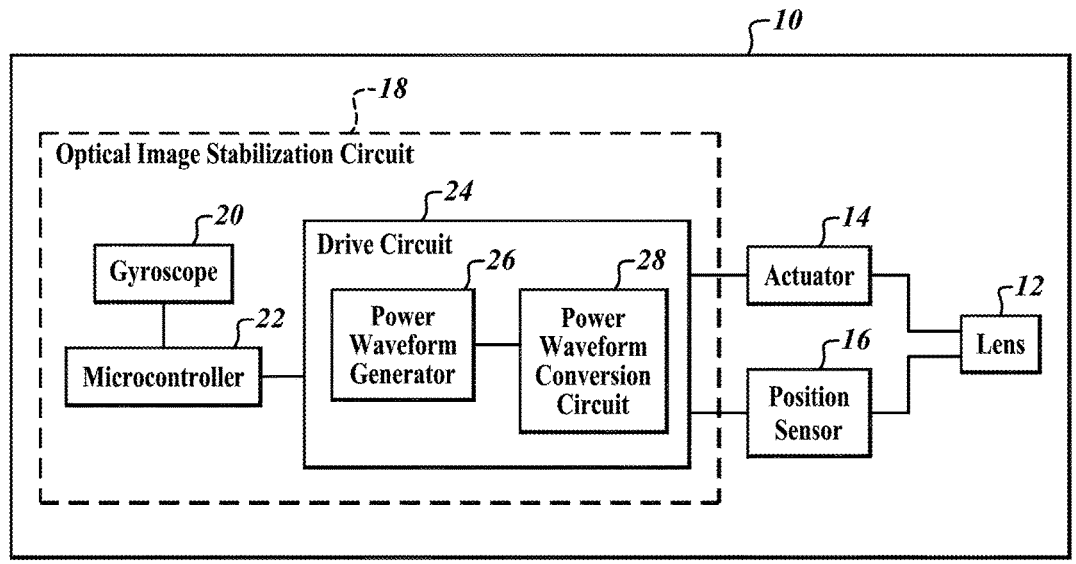
FIG. 1A is a block diagram illustrating an example of a housing including an optical image stabilization circuit according to one embodiment as disclosed herein.

In the following description, certain specific details are set forth in order to provide a thorough understanding of various embodiments of the disclosure. However, one skilled in the art will understand that the disclosure may be practiced without these specific details. In some instances, well-known details associated with optical image stabilization have not been described to avoid obscuring the descriptions of the embodiments of the present disclosure.

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the drawings, identical reference numbers identify similar features or elements. The size and relative positions of features in the drawings are not necessarily drawn to scale.

FIG. 1A is a block diagram illustrating an example of a housing 10 according to principles disclosed herein. A camera lens 12, an actuator 14, a position sensor 16, and an optical image stabilization circuit 18 are positioned within the housing 10. The optical image stabilization circuit 18 includes a gyroscope 20, a microcontroller 22, and a drive circuit 24. The drive circuit 24 includes a power waveform generator and a power waveform conversion circuit 28.

The housing 10 may be any device that includes a camera. For example, the housing 10 may be a smartphone, a tablet, a digital camera, or a portable computer with a built-in camera.

The actuator 14 is coupled to the lens 12 and the drive circuit 24. The actuator 14 is configured to move the lens 12 in response to a power drive signal from the drive circuit 26. The actuator 14 may be based upon a variety of different technologies, such as adaptive liquid lenses, shape memory alloys, or piezo-electric motors. In a preferred embodiment, the actuator 14 is based on a voice coil motor.

The position sensor 16 is coupled to the lens 12 and the drive circuit 24. The position sensor 16 is configured to measure a position of the lens 12, and provide position data of the position of the lens 12 to the drive circuit 24. The position sensor 16 may be any type of sensor configured to detect movements of the lens 12. For example, the position sensor 16 may include photo sensors or hall sensors.

The optical image stabilization circuit 18 is coupled to the actuator 14 and the position sensor 16. The optical image stabilization circuit 18 performs an image stabilization process to minimize the impact of movements or vibrations inflicted upon the housing 10. As previously stated, the optical image stabilization circuit 18 includes the gyroscope 20, the microcontroller 22, and the drive circuit 24.

The gyroscope 20 is coupled to the microcontroller 22. The gyroscope 20 is configured to detect movements of the housing 10 during the instant that a photograph is being taken. For example, if the housing 10 is a smartphone having the lens 12, the gyroscope 20 detects the movements of the smartphone when the aperture of the camera opens to record the image after the user presses the button to take a picture. The gyroscope 20 will sense then output any movement, such as angular rates along lateral, vertical, and longitudinal axes, of the housing 10 having the camera and lens 12 therein. The movement data of the housing 10 is provided to the microcontroller 22 to be used as a reference of angular displacement of the housing 10 relative to the lens 12. Any movement of the housing that occurs for the brief time period that the image is actually being recorded as digital data is counteracted by an equal and opposite movement of the lens itself.

The microcontroller 22 is coupled to the gyroscope 20 and the drive circuit 24. The microcontroller 22 is configured to perform a lens movement control cycle operation to provide image stabilization while a picture is being taken. Particularly, the microcontroller 22 receives movement data of the movement of the housing 10 from the gyroscope 20 and position data of the position of the lens 12 from the position sensor 16 via the drive circuit 24. The microcontroller 22 then calculates power drive signal data based on the movement data and the position data. The power drive signal data is used to generate power drive signals to move the lens to offset and compensate for any movements and vibrations of the housing 10. In one embodiment, as will be discussed in further detail with respect to FIG. 3, the power drive signal data includes a power input parameter ISP, a total bit resolution RES, an amplitude bit resolution AMP, and a transition limit TRN. The microcontroller 22 provides the power drive signal data to the drive circuit 24. The drive circuit 24 then provides a power drive signal based on the power drive signal data to the actuator 14 to move or adjust the lens 12 accordingly.

The drive circuit 24 is coupled to the actuator 14, the position sensor 16, and the microcontroller 22. As previously discussed, the drive circuit 24 is configured to receive position data of the position of the lens 12 from the position sensor 16, and receive power drive signal data from the microcontroller 22. The drive circuit 24 is also configured to provide power drive signals to the actuator 14 to move the lens 12. As previously stated, the drive circuit 24 includes the power waveform generator 26 and the power waveform conversion circuit 28.

The power waveform generator 26 generates a power waveform based on the power drive signal data from the microcontroller 22. As will be discussed in further detail with respect to FIG. 3, a power waveform consists of a plurality of time intervals with each time interval having an amplitude value based on the power drive signal data from the microcontroller 22. The power waveform may have a linear shape, a standard pulse—with modulation shape, or a multi-state pulse-width modulation shape that can have any number of different power levels, duty cycles, and frequencies. The power waveform generator 26 provides the power waveform to the power waveform conversion circuit 28. The power waveform generator 26 will be discussed in further detail with respect to FIG. 3.

The power waveform conversion circuit 28 converts the power waveform received from the power waveform generator 26 to a corresponding power drive signal that is capable of driving the actuator 14. The power waveform conversion circuit 28 is capable of converting a power waveform having any shape, such as a linear shape, a standard pulse—with modulation shape, or a multi-state pulse-width modulation shape. The power waveform conversion circuit 28 will be discussed in further detail with respect to FIG. 1B.

It should be noted that although only one drive circuit, actuator, and position sensor are shown in FIG. 1A, the housing 10 may include any number of drive circuits, actuators, and position sensors.

Figure 1B:
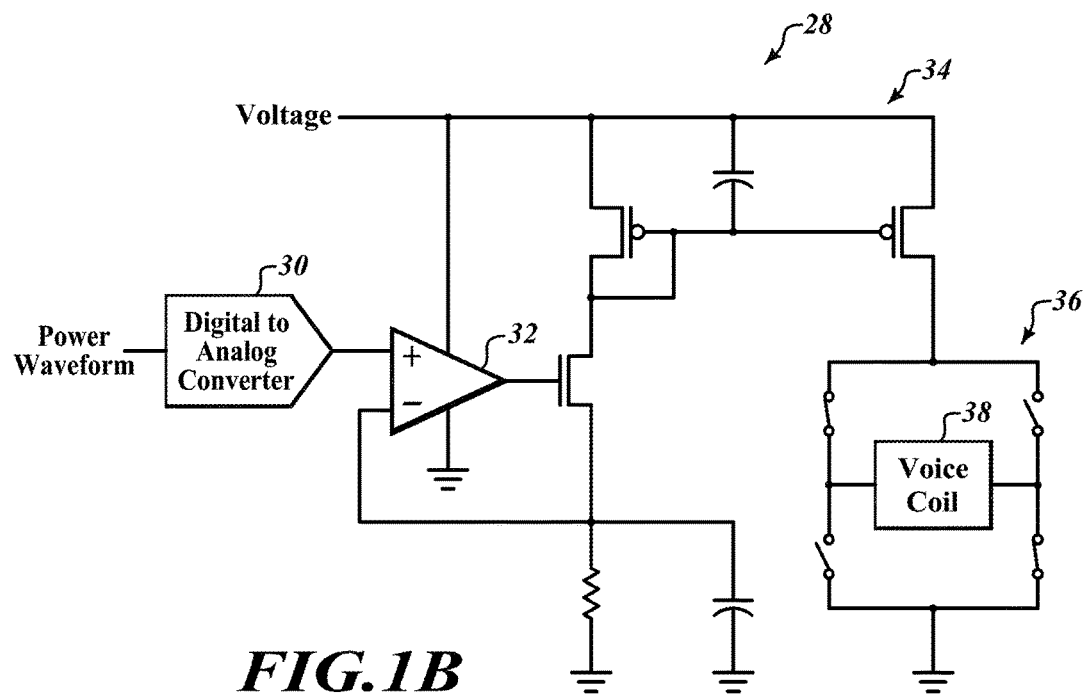
FIG. 1B is a circuit diagram illustrating an example of a power waveform conversion circuit of a drive circuit according to one embodiment as disclosed herein.

FIG. 1B is a circuit diagram illustrating an example of the power waveform conversion circuit 28 of the drive circuit 24 according to one embodiment. In the embodiment shown in FIG. 1B, the actuator 14 is a voice coil motor having a voice coil 38. The power waveform conversion circuit 28 of FIG. 1B includes a digital to analog converter 30; an operational amplifier 32; various integrated circuit components 34, including transistors, resistors, and capacitors; and an H bridge circuit 36. The digital to analog converter 30, the operational amplifier 32, the integrated circuit components 34, and the H bridge circuit 36 are coupled to each other as shown in FIG. 1B.

The digital to analog converter 30 is configured to receive the power waveform from the power waveform generator 26 and convert the power waveform to an equivalent voltage signal having the same shape as the power waveform. Particularly, the digital to analog converter 30 converts the amplitude value for each time interval of the power waveform to a corresponding voltage level. In one embodiment, the digital to analog converter 30 dynamically adjusts the voltage signal to minimize any system offset error. That is, the digital to analog converter 30 tunes the voltage signal by increasing or decreasing its voltage levels to provide an absolute zero crossing.

The operational amplifier 32 and the integrated circuit components 34 are configured to convert the voltage signal generated by the digital to analog converter 30 to a power drive signal to drive the voice coil 38. Particularly, the voltage signal is converted to an equivalent electric current signal. In one embodiment, the operational amplifier 32 and the integrated circuit components 34 applies a gain to the voltage signal such that resulting electric current signal is at a required electric current level to drive the H bridge circuit 36 and the voice coil 38. For example, the operational amplifier 32 and the integrated circuit components 32 may convert the voltage signal to an electric current signal having amplitudes between 0 milliamps to 120 milliamps. The entire available range of voltage or current can be divided into units, with each unit being the sized needed to cover the available range. For example, if the max amplitude is 7 units, then a 3 bit number can be used. The 120 milliamps is divided into 7 equals units of about 17 milliamps each, with a value of zero units being zero milliamps. Similarly, if a more fine power division is desired, such as 9 or 12, then each unit will equal about 13.3 or 10 milliamps, respectively. Further, if a different maximum value is provided, such as 70 milliamps or 240 milliamps, then the available maximum will be divided into the desired number of discrete steps based on the number of units available, whether 8, 9, 10, 16, 24 or the like. For example, use of 32 different units, with zero being one unit is preferred embodiment. The terms to describe motor drive power can be defined in terms of volts, current or combinations thereof, as is known in the art. H bridges and voice coils are known in the art and will not be discussed in detail herein.

It should be understood that the power waveform conversion circuit 28 may be used in conjunction with any type of actuator. As previously discussed, the actuator 14 may be may be based upon a variety of different technologies, such as voice coil motors, adaptive liquid lenses, shape memory alloys, or piezo-electric motors. In another embodiment, the voice coil 38 is replaced with a shape memory alloy and the H bridge circuit is modified accordingly to drive the shape memory alloy as is known in the art.

Figure 1C:
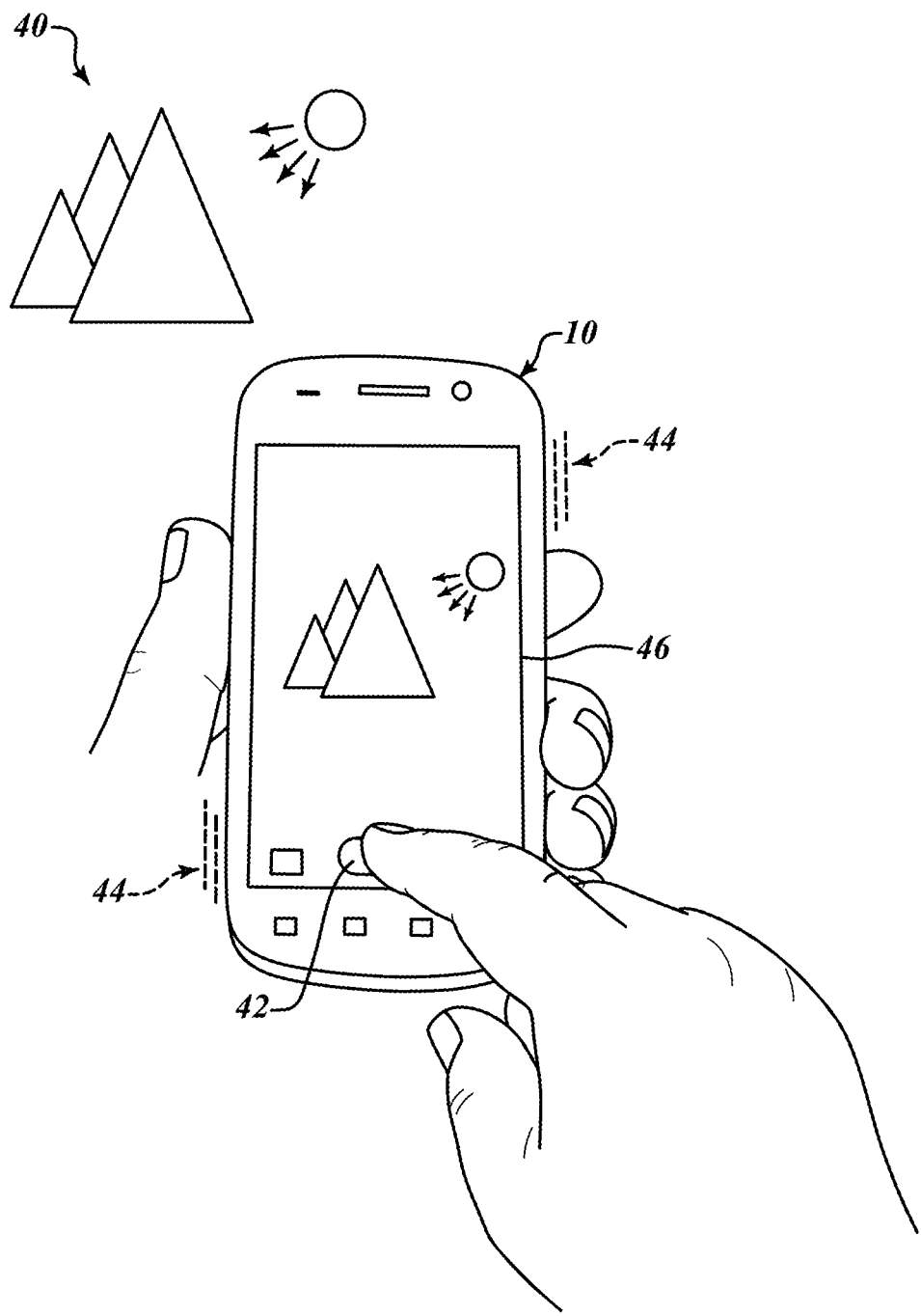
FIG. 1C is an example of a camera undergoing movement and correction according to embodiments disclosed herein.

FIG. 1C illustrates one physical embodiment of use of the circuit and compensation as disclosed herein. As shown in FIG. 1C, the lens 12 is within a smartphone housing 10. Most smartphones today have sophisticated cameras. In addition, most smartphones today include gyroscopes, accelerometers, and various other sensors to sense movement of the smartphone. Within the housing 10 of the smartphone are contained all of the elements as shown in FIG. 1A, namely, the gyroscope 20, the microcontroller 22, the drive circuit 24, the lens 12 together with the actuator 14 and the position sensor 16. These components are not shown in FIG. 1C because they are inside the housing 10. The camera is pointed at a scene 40, which the user is taking a picture of by pressing on button 42. When the user's finger presses button 42 to take a picture, the housing 10 moves with a slight wiggle, as indicated by movement lines 44. This causes the camera, as well as the lens, to move. Under normal conditions, the movement of the housing 10, which contains the camera and the lens 12, occurs simultaneously with taking a picture and will cause the picture to be blurry. However, the picture of scene 40 shows up clear on display 46 because it contains the structure shown in FIG. 1A. Namely, when the camera moves while the user is pressing the button 42, the gyroscope 20 senses the movement and a power drive signal is sent, via the drive circuit 22, to the actuator 14 to move the lens 12 opposite to the movement of the housing 10. Since the movement of the lens 12 counteracts the movement of the housing 10, the picture as shown on the display 46 is clear. The operation of the optical image stabilization circuit 18, the actuator 14, the position sensor 16, and the lens 12, as further explained elsewhere herein, allows a clear image of scene 40 to be taken, even though the camera is moving, as shown by the movement lines 44, at the exact instant the camera is taking a picture.

Figure 2:
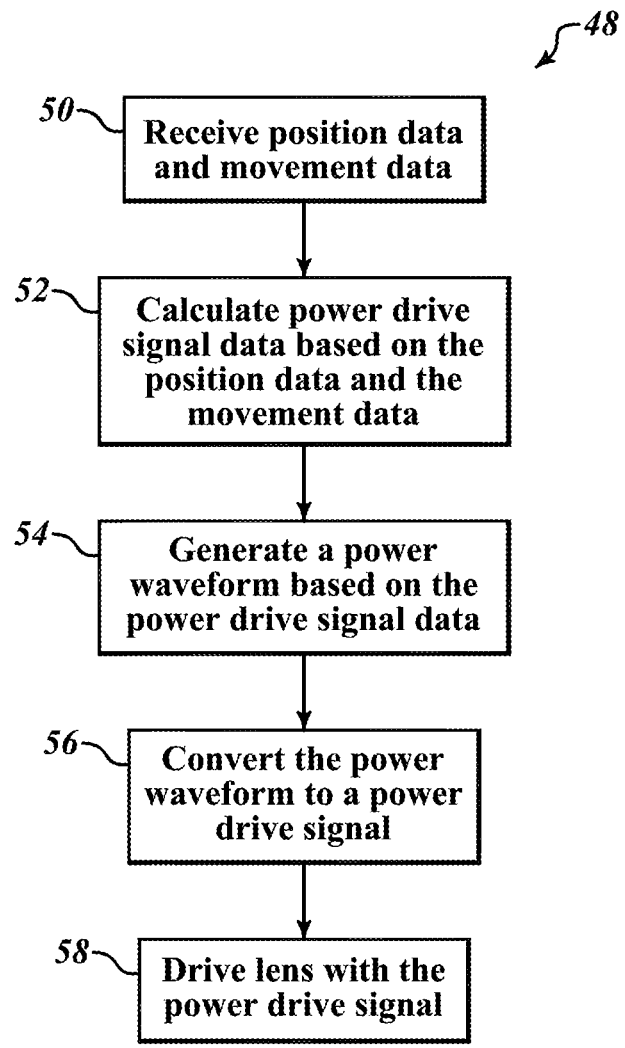
FIG. 2 is a flow diagram illustrating an example of a process for an optical image stabilization circuit according to one embodiment as disclosed herein.

FIG. 2 is a flow diagram illustrating an example of a process 48 for the optical image stabilization circuit 18 according to principles disclosed herein.

At a first step 50, the microcontroller 22 receives movement data of the movement of the housing 10 from the gyroscope 20 and position data of the position of the lens 12 from the position sensor 16 via the drive circuit 24.

In a subsequent step 52, the microcontroller 22 calculates power drive signal data based on the movement data and the position data. The power drive signal data is used by the drive circuit 24 to generate power drive signals to compensate for any movements and vibrations of the housing 10. In one embodiment, as will be discussed in further detail with respect to FIG. 3, the power drive signal data includes a power input parameter ISP, a total bit resolution RES, an amplitude bit resolution AMP, and a transition limit TRN.

In step 54, the power waveform generator 26 of the drive circuit 24 receives the power drive signal data generates a power waveform based on the power drive signal data. The generation of the power waveform will be discussed in further detail with respect to FIG. 3.

In step 56, the power waveform conversion circuit 28 converts the power waveform from the power waveform generator 26 to a corresponding power drive signal. In particular, as previously discussed, the digital to analog converter 30 receives the power waveform from the power waveform generator 26 and converts the power waveform to an equivalent voltage signal having the same shape. The operational amplifier 32 and the integrated circuit components 34 then converts the voltage signal to a power drive signal to drive the H bridge circuit 34 and the voice coil 36.

In step 58, the actuator 14 is driven by the power drive signal to move the lens 12 accordingly and compensate for any movements and vibrations of the housing 10.

Figure 3:
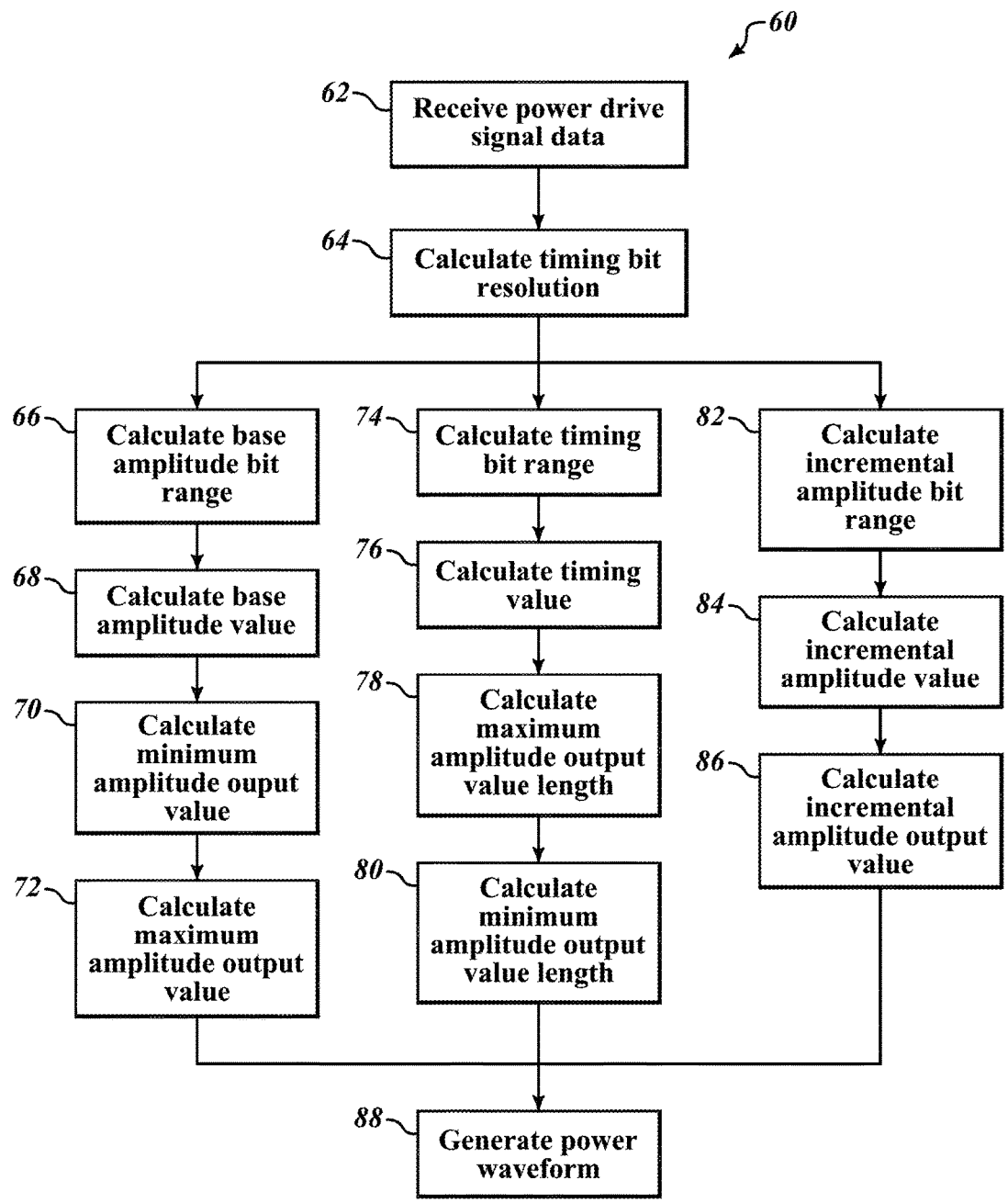
FIG. 3 is a flow diagram illustrating an example of a process for generating a power waveform according to one embodiment as disclosed herein.
Figure 4A:
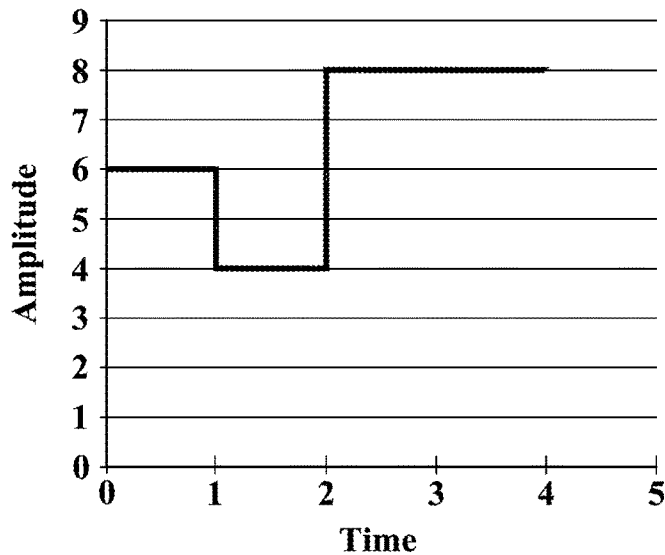
FIG. 4A is a first example of a fixed order power waveform according to embodiments disclosed herein.

FIG. 3 is a flow diagram illustrating an example of a process 60 for the generating of the power waveform in step 54 of process 48 according to principles disclosed herein. It is beneficial to review FIG. 3, particularly step 88, simultaneously with FIG. 4A. FIG. 4A is an example of a fixed order power waveform.

At step 62, the power wave form generator 26 of the drive circuit 24 receives the power drive signal data from the microcontroller 22. In one embodiment, the power drive signal data includes a power input parameter ISP, a total bit resolution RES, an amplitude bit resolution AMP, and a transition limit TRN. In another embodiment, the total bit resolution RES, the amplitude resolution AMP, and the transition limit TRN is not included in the power drive signal data, and is instead preprogrammed in to the power waveform generator 26. Values for the power input parameter ISP, the total bit resolution RES, the amplitude bit resolution AMP, and the transition limit TRN that are used to calculate the fixed order power waveform shown in FIG. 4A is summarized in Table A. Table A also includes a timing resolution PUL for the fixed order power waveform of FIG. 4A, which will be described in further with respect to step 64.

TABLE A

| | |
|---|---|
| Power input parameter ISP | 26 |
| Total bit resolution RES | 5 |
| Amplitude bit resolution AMP | 3 |
| Transition limit TRN | 2 |
| Timing bit resolution PUL | 2 |

The power input parameter ISP is used to generate a power waveform. The power input parameter ISP specifies the total power of the power waveform. The power input parameter ISP is composed of a base amplitude bit range BAR that specifies a base amplitude value BAV, a timing bit range TRG that specifies a timing value TVL, and an incremental amplitude bit range IAR that specifies an incremental amplitude value IAV. For example, the fixed order power waveform of FIG. 4A has a power input parameter ISP equal to a bit value of 011010 or a decimal value of 26. The base amplitude bit range BAR, the timing bit range TRG, and the incremental amplitude bit range IAR and their corresponding values will be discussed in further detail with respect to steps 66, 74, and 82, respectively.

The total bit resolution RES is the bit resolution of the power input parameter ISP. The total bit resolution RES determines the largest value that the power input parameter ISP may be. For example, the fixed order power waveform of FIG. 4A has a total bit resolution RES of 5 bits. As a result, the power input parameter ISP of the fixed order power waveform of FIG. 4A must be less than or equal to $2^5$ or 32. The total bit resolution RES may have any value that the hardware of the optical stabilization circuit 18 will allow for (12 bits, 24 bits, etc.).

The amplitude bit resolution AMP is the bit resolution for the amplitudes of a power waveform. Namely, the amplitude bit resolution AMP determines the number of amplitude units over which the amplitude can vary. For example, the fixed order power waveform of FIG. 4A has an amplitude bit resolution AMP of 3 bits. Thus, the fixed order power waveform of FIG. 4A may have amplitude values between 0 and $2^3$, or 8, amplitude units. An amplitude unit is an amplitude increment that is used by the digital to analog converter 30 to convert a power waveform to an equivalent voltage signal. One amplitude unit, for instance, may converted by the digital to analog converter 30 to one microvolt, millivolt, or one volt. The amplitude bit resolution AMP should be less than or equal to the total bit resolution RES.

The transition limit TRN limits a power waveform's amplitude transition between consecutive time intervals. That is, the transition limit TRN is the maximum amount of amplitude units that a power waveform may change from one time interval to a subsequent time interval. For example, the fixed order power waveform of FIG. 4A has a transition limit TRN of 2 bits. Thus, the maximum change between consecutive intervals of the fixed order power waveform of FIG. 4A is $2^2$ or 4 amplitude units. The transition limit TRN should be less than or equal to the amplitude bit resolution AMP.

In step 64, the total bit resolution RES and the amplitude bit resolution AMP is used to calculate a timing bit resolution PUL. The timing bit resolution PUL is the total amount of bits that is used to specify a timing value TVL. The total bit resolution RES is calculated using the following equation:

PUL=RES−AMP

For example, the fixed order power waveform of FIG. 4A has a timing bit resolution PUL of 2 bits. The timing value TVL will be described in further detail with respect to step 76.

The power input parameter ISP, the total bit resolution RES, the amplitude bit resolution AMP, the transition limit TRN, and the timing bit resolution PUL are used to calculate a base amplitude bit range BAR, a timing bit range TRG, an incremental amplitude bit range IAR, a base amplitude value BAV, a timing value TVL, an incremental amplitude value IAV, a minimum amplitude output value MIN, a maximum amplitude output value MAX, an incremental amplitude output value INC, a maximum amplitude output value length TUH, and a minimum amplitude output value length TUL. The calculations of these values for the fixed order power waveform shown in FIG. 4A is summarized in Table B. It is important note that an additional bit is added when performing the calculations in case the power input parameter ISP is equal to its maximum value. For example, 6 bits are used for the calculations shown in Table B to account for the maximum bit value of 100000 of the power input parameter ISP, which has a total bit resolution RES of $2^5$ or 32.

TABLE B

| | Binary value | | | | | | Decimal |
|---|---|---|---|---|---|---|---|
| Bit position | 5 | 4 | 3 | 2 | 1 | 0 | value |
| Base amplitude bit range BAR | 1 | 1 | 0 | 0 | 0 | 0 | 48 |
| Timing bit range TRG | 0 | 0 | 1 | 1 | 0 | 0 | 12 |
| Incremental amplitude bit range IAR | 0 | 0 | 0 | 0 | 1 | 1 | 3 |
| Power input parameter ISP | 0 | 1 | 1 | 0 | 1 | 0 | 26 |
| Base amplitude value BAV | 0 | 1 | 0 | 0 | 0 | 0 | 16 |
| Timing value TVL | 0 | 0 | 1 | 0 | 0 | 0 | 8 |
| Incremental amplitude value IAV | 0 | 0 | 0 | 0 | 1 | 0 | 2 |
| Minimum amplitude output value MIN | 0 | 0 | 0 | 1 | 0 | 0 | 4 |
| Maximum amplitude output value MAX | 0 | 0 | 1 | 0 | 0 | 0 | 8 |
| Incremental amplitude output value INC | 0 | 0 | 0 | 1 | 1 | 0 | 6 |
| Maximum amplitude output value length TUH | 0 | 0 | 0 | 0 | 1 | 0 | 2 |
| Minimum amplitude output value length TUL | 0 | 0 | 0 | 0 | 0 | 1 | 1 |

In step 66, the base amplitude bit range BAR is calculated. The base amplitude bit range BAR is the bit range of the power input parameter ISP that specifies the base amplitude value BAV. Particularly, the base amplitude bit range BAR is used as a mask to parse the base amplitude value BAV from the power input parameter ISP. The base amplitude bit range BAR is calculated using the following equation:

$$BAR=2^{RES+1}-2^{TRN+PUL}$$

For example, referring to Table B, the fixed order power waveform of FIG. 4A has a base amplitude bit range BAR equal to a bit value of 110000. Thus, bit positions 4 and 5 of the power input parameter ISP specifies the base amplitude value BAV for the fixed order power waveform of FIG. 4A.

In step 68, the base amplitude value BAV is calculated. The base amplitude value BAV is an intermediary value that is used to calculate the minimum amplitude output value MIN. The base amplitude value BAV is obtained by parsing the power input parameter ISP by using the base amplitude bit range BAR. Particularly, the base amplitude value BAV is calculated using the following equation:

$$BAV = ISP \text{ AND } BAR$$

For example, referring to Table B, the fixed order power waveform of FIG. 4A has a base amplitude value BAV equal to a bit value of 010000.

In step 70, the minimum amplitude output value MIN is calculated. The minimum amplitude output value MIN is the lowest amplitude that a power wave form may have. The minimum amplitude output value MIN is calculated by removing the bits of the timing bit range TRG. This is done by shifting the base amplitude value BAV to the right by a number of bits equal to the timing bit resolution PUL. For instance, referring to Table B, the fixed order power waveform of FIG. 4A has a minimum amplitude output value MIN equal to a bit value of 000100 or a decimal value of 4. This is obtained by shifting the base amplitude value BAV, which has a bit value of 010000, to the right by the number of bits equal to the timing bit resolution PUL, which is 2 bits. Thus, the lowest amplitude that the fixed order power waveform may have is 4 amplitude units.

In step 72, the maximum amplitude output value MAX is calculated. The maximum amplitude output value MAX is the largest amplitude that a power waveform may have. The maximum amplitude output value MAX is calculated using the following equation:

$$MAX = MIN + 2^{TRN}$$

For example, referring to Table B, the fixed order power waveform of FIG. 4A has a maximum amplitude output value MAX equal to a bit value of 001000 or a decimal value of 8. As such, the largest amplitude that the fixed order power waveform of FIG. 4A may have is 8 amplitude units, the maximum amplitude available in this example.

In step 74, the timing bit range TRG is calculated. The timing bit range TRG is the bit range of the power input parameter ISP that specifies the timing value TVL. Particularly, the timing bit range TRG is used as a mask to parse the timing value TVL from the power input parameter ISP. The timing bit range TRG is calculated using the following equation:

$$TRG = 2^{TRN} * (2^{PUL} - 1)$$

For instance, referring to Table B, the fixed order power waveform of FIG. 4A has a timing bit range TRG equal to a bit value of 001100. As such, bit positions 2 and 3 of the power input parameter ISP specifies the timing value TVL for the fixed order power waveform of FIG. 4A.

In step 76, the timing value TVL is calculated. The timing value TVL is an intermediary value that is used to calculate the maximum amplitude output value length TUH. The timing value TVL is obtained by parsing the power input parameter ISP by using the timing bit range TRG. Particularly, the timing value TVL is calculated using the following equation:

$$TVL = ISP \text{ AND } TRG$$

For example, referring to Table B, the fixed order power waveform of FIG. 4A has a timing value TVL equal to a bit value of 001000.

In step 78, the maximum amplitude output value length TUH is calculated. The maximum amplitude output value length TUH is the total number of time units of the maximum amplitude output value MAX that a power waveform may have. Each time unit represents an increment of time. One time unit, for instance, may be equal to one nanosecond, one microsecond, or one second. The maximum amplitude output value length TUH is calculated by shifting the timing value TVL to the right by a number of bits equal to the transition limit TRN. For instance, referring to Table B, the fixed order power waveform of FIG. 4A has a maximum amplitude output value length TUH equal to a bit value of 000010 or a decimal value of 2. This is obtained by shifting the timing value TVL, which has a bit value of 001000, to the right by the number of bits equal to the transition limit TRN, which is 2 bits. Thus, the fixed order power waveform of FIG. 4A has the maximum amplitude output value MAX, which in this case is 8 amplitude units, for a total of 2 time units.

In step 80, the minimum amplitude output value length TUL is calculated. The minimum amplitude output value length TUL is the total number of time units of the minimum amplitude output value MIN that a power waveform may have. The minimum amplitude output value length TUL, which is the complement of the maximum amplitude output value length TUH, is calculated using the following equation:

$$TUL = 2^{PUL} - 1 - TUH$$

For example, referring to Table B, the fixed order power waveform of FIG. 4A has a minimum amplitude output value length TUL equal to a bit value of 000001 or a decimal value of 1. Thus, the fixed order power waveform of FIG. 4A has the minimum amplitude output value MIN, which in this case is 4 amplitude units, for a total of 1 time unit.

In step 82, the incremental amplitude bit range IAR is calculated. The incremental amplitude bit range IAR is the bit range of the power input parameter ISP that specifies the incremental amplitude value IAV. Namely, the incremental amplitude bit range IAR is used as a mask to parse the incremental amplitude value IAV from the power input parameter ISP. The incremental amplitude bit range IAR is calculated using the following equation:

$$IAR = 2^{TRN} - 1$$

For example, referring to Table B, the fixed order power waveform of FIG. 4A has an incremental amplitude bit range IAR equal to a bit value of 000011. As a result, bit positions 0 and 1 of the power input parameter ISP specifies the incremental amplitude value IAV.

In step 84, the incremental amplitude value IAV is calculated. The incremental amplitude value IAV is an intermediary value that is used to calculate the incremental amplitude output value INC. The incremental amplitude value IAV is obtained by parsing the power input parameter ISP by using the incremental amplitude bit range IAR. Particularly, the incremental amplitude value IAV is calculated using the following equation:

$$IAV = ISP \text{ AND } IAR$$

For example, referring to Table B, the fixed order power waveform of FIG. 4A has an incremental amplitude value IAV, which equal to a bit value of 000010.

In step 86, the incremental amplitude output value INC is calculated. The incremental amplitude output value INC is an intermediary amplitude of a power waveform that is between the minimum amplitude output value MIN and the maximum amplitude output value MAX. The incremental amplitude output value INC is calculated using the following equation:

$$INC=MIN+IAV$$

For instance, referring to Table B, the fixed order power waveform of FIG. 4A has an incremental amplitude output value INC equal to a bit value of 000110 or a decimal value of 6. As such, the incremental amplitude output value INC of the fixed order power waveform of FIG. 4A is 6 amplitude units. It should be noted that although step 70 and step 86 are shown to be in parallel with each other in FIG. 3, step 86 is performed subsequent to step 70 because the incremental amplitude output value INC uses the minimum amplitude output value MIN in its calculation.

In step 88, the power waveform is generated. The power wave form is formed by using the minimum amplitude output value MIN, the maximum amplitude output value MAX, the incremental amplitude output value INC, the maximum amplitude output value length TUH, and the minimum amplitude output value length TUL.

The total number of time units of the power waveform is calculated using the following equation:

$$\text{Total number of time units}=2^{PUL},$$

The total number of time units represents the length of the power waveform. For example, the fixed order power waveform of FIG. 4A has a total length of 4 time units.

In one embodiment, the power waveform is a fixed order power waveform. A fixed order power waveform is composed of a plurality of time intervals. Time intervals for the fixed order power waveform shown in FIG. 4A are summarized in Table C.

TABLE C

| Time interval | Amplitude | Length of time interval |
|---|---|---|
| 0 | 6 | 1 |
| 1 | 4 | 1 |
| 2 | 8 | 2 |

The first time interval, or time interval 0, of a fixed order power waveform has a length of 1 time unit. For instance, referring to Table C, time interval 0 for the fixed order power waveform of FIG. 4A has a length of 1 time unit. The lengths of subsequent time intervals are determined by performing a bit progression. That is, the second time interval has a length equal to $2^0$ time units, the third time interval has a length equal to $2^1$ time units, the fourth time interval has a length equal to $2^2$ time units, and so on. As a result, each successive time interval has a length equal to double the length of the previous time interval. For example, referring to Table C, time interval 1 for the fixed order power waveform of FIG. 4A has a length of 1 time unit and time interval 2 has a length of 2 time units.

For a fixed order power waveform, the amplitude of each time interval is equal to the minimum amplitude output value MIN, the maximum amplitude output value MAX, or the incremental amplitude output value INC. The amplitude of the first time interval, time interval 0, is equal to the incremental amplitude output value INC. Namely, the amplitude of time interval 0 is calculated using the following equation:

$$\text{Time interval } 0=INC$$

For example, referring to Tables B and C, time interval 0 for the fixed order power waveform of FIG. 4A has an amplitude equal to the incremental amplitude output value INC, which is 6. The amplitudes of the remaining time intervals are equal to the minimum amplitude output value MIN or the maximum amplitude output value MAX based on the maximum amplitude output value length TUH. Specifically, the amplitude of the second time interval, time interval 1, is calculated using the following equation:

If the least significant bit of *TUH* is 1, then timing interval 1=MAX, else timing interval 1=MIN For example, referring to Tables B and C, time interval 1 for the fixed order power waveform of FIG. 4A has an amplitude equal the minimum amplitude output value MIN, which is 4, because the least significant bit of the maximum amplitude output value TUH is equal to 0. Each successive time interval is calculated using the corresponding successive bit of the maximum amplitude output value length TUH. For example, the amplitude of time interval 2 is calculated using the following equation:

If the second from the least significant bit of *TUH* is 1, then timing interval 2=MAX, else timing interval 2=MIN For example, referring to Tables B and C, time interval 2 for the fixed order power waveform of FIG. 4A has an amplitude equal the maximum amplitude output value MAX, which is 8, because the second from the least significant bit of the maximum amplitude output value TUH is equal to 1.

Figure 4B:
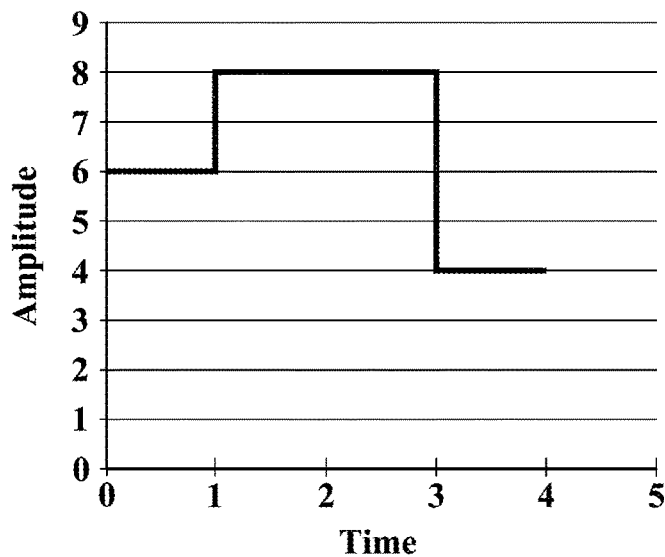
FIG. 4B is an example of a sorted order power waveform based on the fixed order power waveform of FIG. 4A according to embodiments disclosed herein.
Figure 5A:
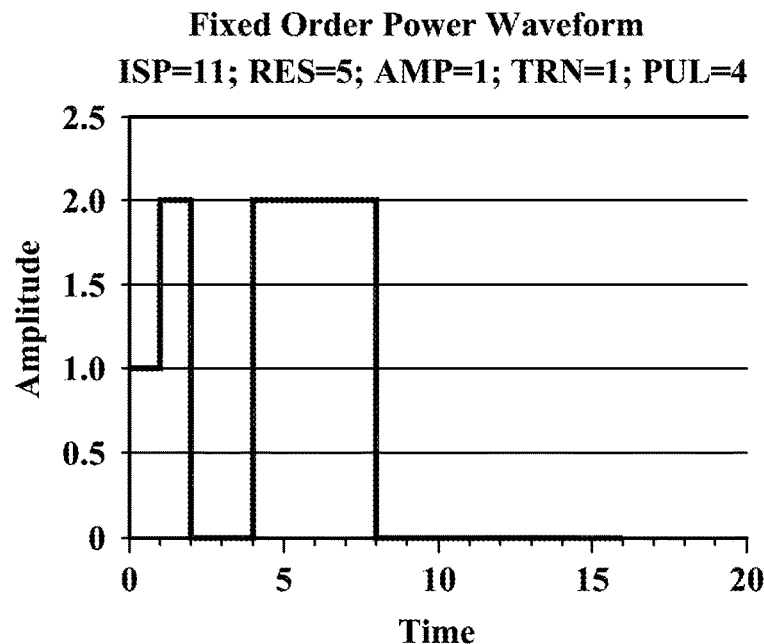
FIG. 5A is a second example of a fixed order power waveform according to embodiments disclosed herein.
Figure 5B:
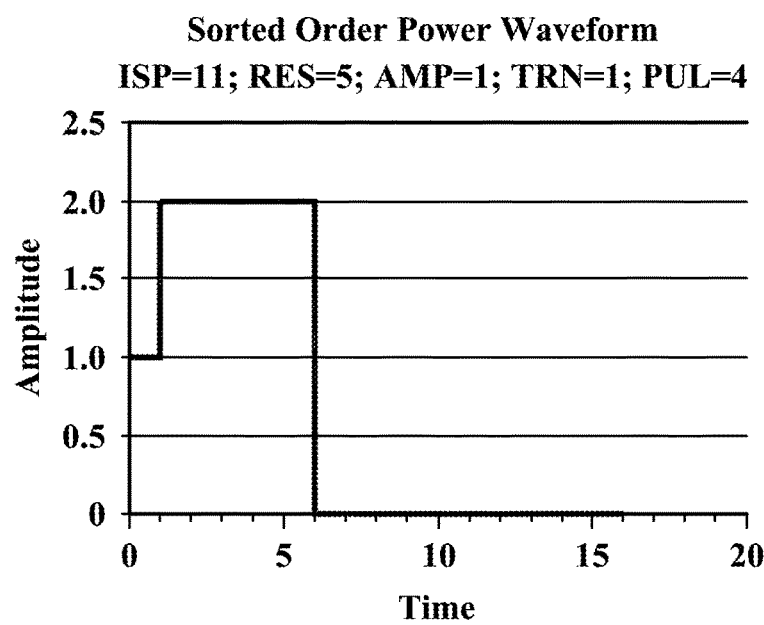
FIG. 5B is a second example of a sorted order power waveform based on the fixed order power waveform of FIG. 5B according to embodiments disclosed herein.
Figure 6A:
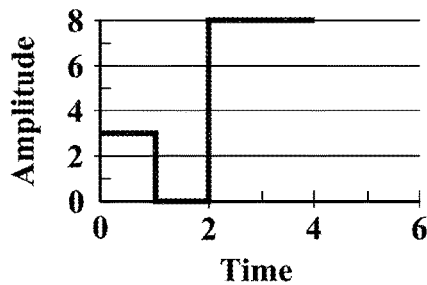
FIG. 6A, FIG. 6B, FIG. 6C, and FIG. 6D are examples of fixed order power waveforms having a range of transition limit values according to embodiments disclosed herein.
Figure 6B:
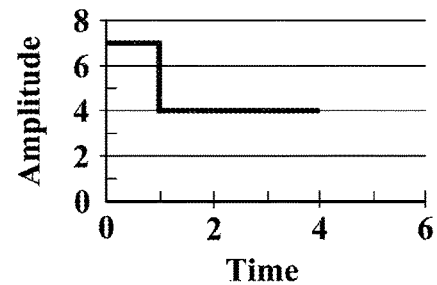
Figure 6C:
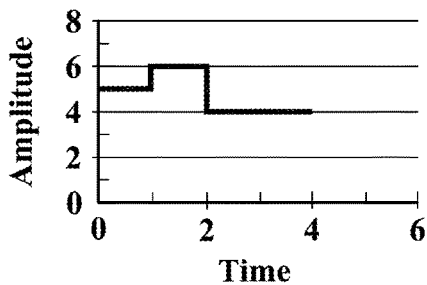
Figure 6D:
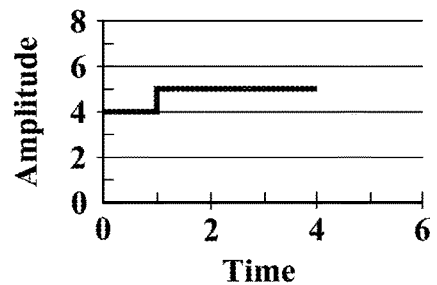
Figure 7A:
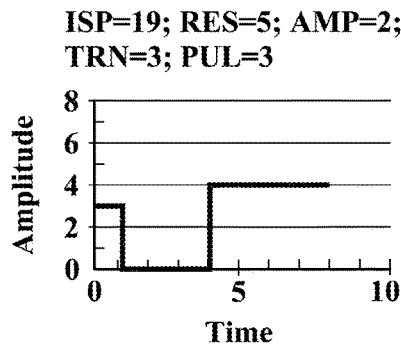
FIG. 7A, FIG. 7B, FIG. 7C, and FIG. 7D are examples of fixed order power waveforms having a range of amplitude bit resolution values according to embodiments disclosed herein.
Figure 7B:
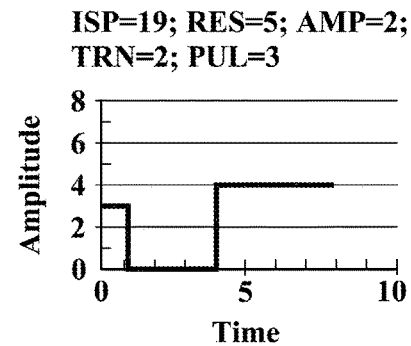
Figure 7C:
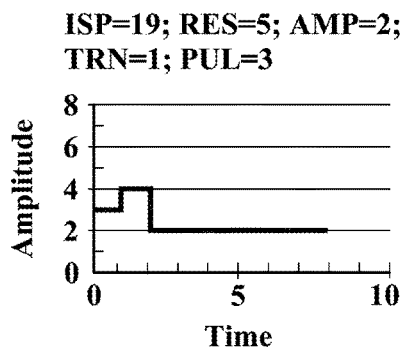
Figure 7D:
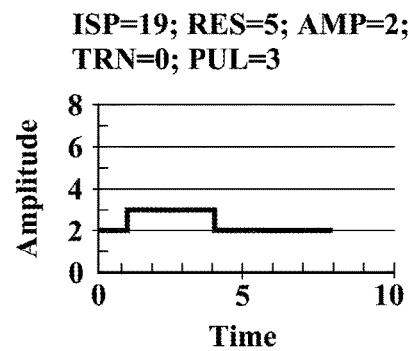

In another embodiment, the power waveform is a sorted order power waveform. FIG. 4B is an example of a sorted order power waveform based on the fixed order power waveform shown in FIG. 4A. In contrast to a fixed order power waveform, a sorted order power waveform order may have time intervals arranged in any order. In a preferred embodiment, time intervals are ordered to minimize the amount of transitions between the maximum amplitude output value MAX and the minimum amplitude output value MIN to prevent unnecessary transients in the system. For instance, time intervals that have amplitudes equal to the maximum amplitude output value MAX may be grouped together to be consecutive and time intervals that have amplitudes equal to the minimum amplitude output value MIN may be grouped together to be consecutive. In one embodiment, a sorted order power waveform is formed by having the incremental amplitude output value INC for 1 time unit, the maximum amplitude output value MAX for a number of time units equal to the maximum amplitude output value length TUH, and the minimum amplitude output value MIN for a number of time units equal to the minimum amplitude output value length TUL. For example, referring to Table B, the sorted order power waveform of FIG. 4B has an amplitude equal to 6 amplitude units (i.e., the incremental amplitude output value INC) for 1 time unit, 8 amplitude units (i.e., the maximum amplitude output value MAX) for 2 time units (i.e., the maximum amplitude output value length TUH), and 4 amplitude units (i.e., the minimum amplitude output value MIN) for 1 time unit (i.e., the minimum amplitude output value length TUL). As an additional example, FIG. 5A shows an example of a fixed order power waveform having a power input parameter ISP equal to 11, a total bit resolution RES equal to 5, an amplitude bit resolution AMP equal to 1, a transition limit TRN equal to 1, and a timing bit resolution PUL equal to 4. FIG. 5B shows an example of a sorted power waveform based on the fixed order power waveform shown in FIG. 5A. As shown in FIG. 5B, the amount of transitions between the maximum amplitude output value MAX and the minimum amplitude output value MIN is minimized.

Figure 4C:
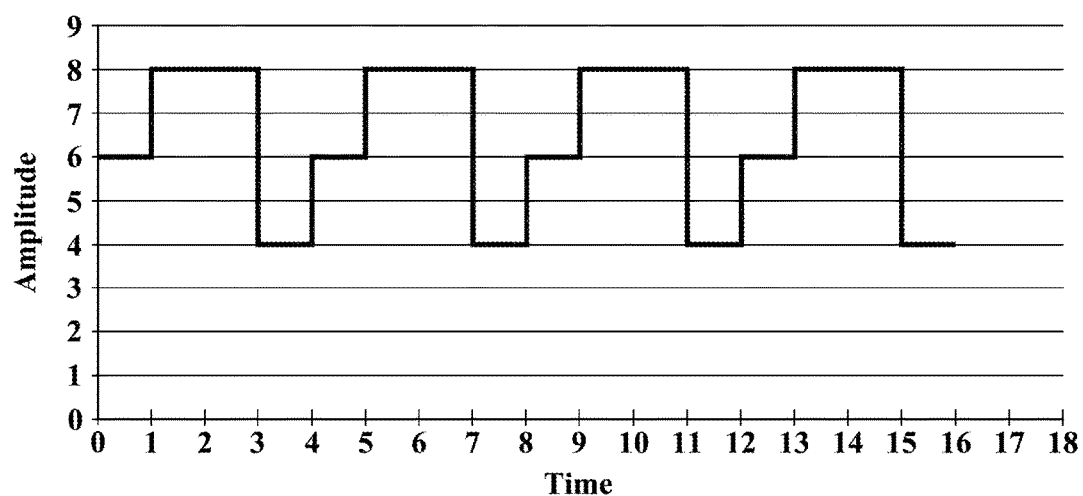
FIG. 4C is an example of a multi cycle sorted order power waveform based on the fixed order power waveform of FIG. 4A according to embodiments disclosed herein.

In a further embodiment, the power waveform is a multi-cycle power waveform. FIG. 4C is an example of a multi cycle sorted order power waveform. For a multi-cycle power waveform, a fixed order power waveform or a sorted order power waveform is repeated for successive cycles. For example, as shown in FIG. 4C, the sorted order power wave of FIG. 4B is repeated for 4 cycles.

The power waveform generator 26 as described herein is capable of generating a scalable power waveform that may have any power level, duty cycle, and frequency that the hardware of the system allows for by varying the power input parameter ISP, the total bit resolution RES, the amplitude bit resolution AMP, or the transition limit TRN. The power waveform may have a linear shape and a standard pulse-width modulation shape. For example, a power waveform having linear shape may be created by setting the total bit resolution RES to be equal to the amplitude bit resolution AMP, and a power waveform having a standard pulse-width modulation shape may be created by setting the amplitude bit resolution AMP to be equal to zero. In addition, the power waveform generator 26 is capable of generating a multi-state pulse-width modulation power waveform that can have multiple different power levels, duty cycles, and frequencies. In contrast to a standard pulse-width modulation power waveform, in which there are only two power levels (high and low), a multi-state pulse-width modulation power waveform may have power levels of 1, ½, ⅓, ¼, or some other value less than the full power level and greater than the lowest power level, and the width of each pulse within a cycle can vary greatly.

FIG. 6A, FIG. 6B, FIG. 6C, and FIG. 6D illustrates how a fixed order power waveform will vary with different transition limit TRN values. The fixed order power waveforms of FIG. 6A, FIG. 6B, FIG. 6C, and FIG. 6D have a power input parameter ISP equal to 19, a total bit resolution RES equal to 5, and an amplitude bit resolution AMP equal to 3. The transition limit TRN of FIG. 6A, FIG. 6B, FIG. 6C, and FIG. 6D is equal to 3, 2, 1, and 0, respectively. FIG. 7A, FIG. 7B, FIG. 7C, and FIG. 7D illustrates how the fixed order power waveforms of FIG. 6A, FIG. 6B, FIG. 6C, and FIG. 6D vary with a different amplitude bit resolution AMP value. The amplitude bit resolution AMP of FIG. 7A, FIG. 7B, FIG. 7C, and FIG. 7D is equal to 2.

The optical image stabilization circuit 18 disclosed herein is capable of generating linear power drive signals, standard pulse-width modulation power drive signals, and multi-state pulse-width modulation power drive signals to drive the actuator 14. The frequency of the power drive signals are limited only by the speed of the power waveform generator 26 and the power waveform conversion circuit 28 of the drive circuit 24.

It should be understood that, although the drive circuit 24 is discussed in the context of optical image stabilization, the drive circuit 24 may be applied to any application with an actuator.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A device, comprising:
a lens;
an actuator configured to move the lens;
a position sensor configured to measure a position of the lens;
a gyroscope configured to measure movement of the device;
a controller configured to determine drive signal data based on the position of the lens and the movement of the device; and
a drive circuit configured to:
calculate a base amplitude value based on the drive signal data;
calculate a minimum non-zero amplitude value by shifting bits of the base amplitude value,
calculate a maximum non-zero amplitude value based on the minimum non-zero amplitude value,
calculate durations for the minimum non-zero amplitude value, the maximum non-zero amplitude value, and an intermediate non-zero amplitude value based on the drive signal data,
generate a waveform using the minimum, the maximum, and the intermediate non-zero amplitude values and the durations for the minimum, the maximum, and the intermediate non-zero amplitude values,
convert the waveform to a drive signal, and
drive the actuator to move the lens, the waveform including a plurality of cycles, each of plurality of cycles including the minimum, the maximum, and the intermediate non-zero amplitude values.

2. The device of claim 1, wherein the drive circuit includes a digital to analog converter and a voltage to current converter circuit.

3. The device of claim 1 wherein the drive signal data includes a power input parameter that sets a total power value for the waveform.

4. The device of claim 3 wherein the drive circuit is configured to calculate an incremental amplitude value by parsing a bit range of the power input parameter, and to calculate the intermediate non-zero amplitude value based on the incremental amplitude value and the minimum non-zero amplitude value.

5. The device of claim 1 wherein the drive signal data includes a transition limit parameter that sets a maximum amount of change in amplitude between one time interval to a subsequent time interval for the waveform.

6. The device of claim 1 wherein the drive circuit is configured to:
calculate a timing value based on the drive signal data;
calculate a maximum amplitude output value length by shifting bits of the timing value, the maximum amplitude output value length indicating a time duration for the maximum non-zero amplitude value in each of the plurality of cycles; and calculate a minimum amplitude output value length based on the maximum amplitude output value length, the minimum amplitude output value length indicating a time duration for the minimum non-zero amplitude value in each of the plurality of cycles.

7. A device, comprising:
a lens;
an actuator configured to move the lens;
a position sensor configured to measure a position of the lens;
a gyroscope configured to measure movement of the device;
a controller configured to calculate parameters based on the position of the lens and the movement of the device, the calculated parameters including:
a base amplitude value that is calculated based on the position of the lens and the movement of the device,
a minimum non-zero amplitude value that is calculated by shifting bits of the base amplitude value, and
a maximum non-zero amplitude value that is calculated based on the minimum non-zero amplitude value;
a power waveform generator configured to generate a waveform based on the calculated parameters, the waveform including a plurality of cycles, each of plurality of cycles including the minimum non-zero amplitude value, the maximum non-zero amplitude value, and an intermediate non-zero amplitude value;
a power waveform converter configured to convert the waveform to a to a drive signal; and
a drive circuit configured to drive the actuator with the drive signal to move the lens.

8. The device of claim 7 wherein the parameters includes the intermediate non-zero amplitude value for the waveform.

9. The device of claim 8 wherein the parameters includes timing values of the minimum, the maximum, and the intermediate non-zero amplitude values for the waveform.

10. The device of claim 7 wherein the parameters includes a power input parameter that sets a total power value for the waveform, and the controller is configured to calculate an incremental amplitude value by parsing a bit range of the power input parameter, and to calculate the intermediate non-zero amplitude value based on the incremental amplitude value and the minimum non-zero amplitude value.

11. The device of claim 7 wherein the parameters includes a power input parameter that sets a total power value for the waveform.

12. The device of claim 7 wherein the parameters includes a transition limit parameter that sets a maximum amount of change in amplitude between one time interval to a subsequent time interval for the waveform.

13. The device of claim 7 wherein the power waveform converter includes a digital to analog converter and a voltage to current converter.

14. The device of claim 7 wherein the power waveform converter is configured to dynamically adjust the voltage signal to minimize an offset error.

15. A device, comprising:
an actuator;
a waveform generator configured to:
receive drive signal data;
calculate a base amplitude value based on the drive signal data;
calculate a minimum non-zero amplitude value by shifting bits of the base amplitude value,
calculate a maximum non-zero amplitude value based on the minimum non-zero amplitude value,
calculate durations of the minimum non-zero amplitude value, the maximum non-zero amplitude value, and an intermediate non-zero amplitude value based on the drive signal data; and
generate a waveform based on the minimum, the maximum, and the intermediate non-zero amplitude values and durations of the minimum, the maximum, and the intermediate non-zero amplitude values, the waveform including a plurality of cycles, each of plurality of cycles including the minimum, the maximum, and the intermediate non-zero amplitude values;
a waveform converter configured to convert the waveform to a drive signal; and
a drive circuit configured to drive the actuator with the drive signal.

16. The device of claim 7 wherein the controller is configured to:
calculate a timing value based on the position of the lens and the movement of the device;
calculate a maximum amplitude output value length by shifting bits of the timing value, the maximum amplitude output value length indicating a time duration for the maximum non-zero amplitude value in each of the plurality of cycles; and
calculate a minimum amplitude output value length based on the maximum amplitude output value length, the minimum amplitude output value length indicating a time duration for the minimum non-zero amplitude value in each of the plurality of cycles.

17. The device of claim 15 wherein the drive signal data includes a power input parameter that sets a total power value for the waveform.

18. The device of claim 17 wherein the waveform generator is configured to calculate an incremental amplitude value by parsing a bit range of the power input parameter, and to calculate the intermediate non-zero amplitude value based on the incremental amplitude value and the minimum non-zero amplitude value.

19. The device of claim 15 wherein the drive signal data includes a transition limit parameter that sets a maximum amount of change in amplitude between one time interval to a subsequent time interval for the waveform.

20. The device of claim 15 wherein the waveform converter includes a digital to analog converter and a voltage to current converter.

* * * * *